United States Patent [19]

DiMarcello

[11] 3,927,238

[45] Dec. 16, 1975

[54] LEAD-FREE GLAZE FOR HIGH DENSITY ALUMINA

[75] Inventor: Frank Vincent DiMarcello, Clinton Township, Hunterdon County, N.J.

[73] Assignee: Bell Telephone Laboratories, Incorporated, Murray Hill, N.J.

[22] Filed: May 7, 1973

[21] Appl. No.: 358,004

[52] U.S. Cl. .................. 428/336; 428/432; 106/48; 106/52
[51] Int. Cl.$^2$ .. B32B 17/06; C03C 5/02; C03C 3/04
[58] Field of Search .... 106/48, 52; 117/121, 124 A, 117/125; 161/192; 428/432, 336

[56] References Cited
UNITED STATES PATENTS

| | | | |
|---|---|---|---|
| 2,544,060 | 3/1951 | Amberg et al. | 106/48 |
| 2,933,552 | 4/1960 | Schurecht | 106/52 |
| 3,531,303 | 9/1970 | Bahat | 106/52 |

OTHER PUBLICATIONS

Harman; C. G. et al., "Raw Leadless Whiteware Glazes" Journal American Ceramic Society 28(2) pgs. 48–52 (1945).

Parmelee; C. W., "Ceramic Glazes," Industrial Publications Inc., Chicago, Illinois, pgs. 16, 17, 20 & 21 (1951).

Primary Examiner—Winston A. Douglas
Assistant Examiner—Mark Bell
Attorney, Agent, or Firm—J. C. Fox; G. S. Indig

[57] ABSTRACT

A ceramic substrate glaze which is of particular interest for use upon high density alumina substrates includes an oxide mixture containing $SiO_2$, $Al_2O_3$, SrO, CaO and BaO. The fired thickness of the glaze may be reduced by adding two or more of the oxides $K_2O$, $Li_2O$ and $MoO_3$ to the oxide mixture.

5 Claims, No Drawings

LEAD-FREE GLAZE FOR HIGH DENSITY ALUMINA

BACKGROUND OF THE INVENTION

This invention relates to a ceramic substrate glaze. More particularly it relates to a multicomponent oxide glaze of particular interest for use on high density alumina substrates and to a technique for the preparation thereof.

High alumina ceramics continue to serve an important role as substrates for thin film circuits in the electronics industry. Depending upon the application, the surface characteristics of the substrates can be critical. For example, thin film capacitors require a very smooth substrate surface in order to maintain their electrical stability. One method of achieving such surface smoothness is to coat the substrate with an electrically insulating ceramic glaze. In addition to surface smoothness, the glaze should be capable of flowing out to a relatively thin fired thickness (for example from 0.3 to 1 mil) in order to minimize thermal barrier effects and possible circuit discontinuities between glazed and unglazed areas. The addition of significant amounts of alkali oxides to glazed compositions ordinarily enhances their surface smoothness and flow properties but also degrades electrical resistivity. Lead oxide also improves flow properties but does not significantly affect resistivity and is thus an important constituent of a thin glaze described in U.S. Pat. No. 3,470,002, issued to Frank V. DiMarcello and Arnold W. Treptow on Sept. 30, 1969 and assigned to the present assignee. Recently it has been found that the PbO and $Bi_2O_3$ in this glaze are subject to chemical reduction, for example, during capacitor formation by oxidation of the tantalum underlayer deposited on it. Although changes have been made in the oxidation procedure to circumvent the immediate problem, the increasing chemical complexity of thin films is likely to give rise to the requirement for a glaze which is more stable in reducing atmospheres. Currently available glazes which contain only nonreducible oxides cannot be applied in thicknesses bebw 1 mil while maintaining other requirements for thin film substrates.

SUMMARY OF THE INVENTION

In accordance with the present invention a technique is described for the preparation of a novel ceramic glaze comprising a mixture of oxides including $SiO_2$, $Al_2O_3$, SrO, CaO, BaO, $K_2O$, $Li_2O$ and $MoO_3$ in specific proportions. The resultant composition has been found superior to prior art glazes in that it is essentially inert to reducing atmospheres and gives smooth surfaces in thicknesses below 1 mil and is otherwise suitable as a substrate glaze for high alumina substrates.

DETAILED DESCRIPTION OF THE INVENTION

In order to obtain a satisfactory glaze in thicknesses below 1 mil it has been found essential to employ $SiO_2$, $Al_2O_3$, SrO, CaO and BaO. Thicknesses below 0.5 mil may be obtained by adding one or more of the oxides $K_2O$, $Li_2O$ and $MoO_3$ without significantly affecting other properties. These additives improve flowability of the glaze by promoting decreased viscosity and/or increased wettability of the glaze.

Initially the materials employed in preparing the glaze are obtained from commercial sources, reagent grade materials being satisfactory for the purposes of the invention. The complexity of the described system and the dependency of the effects among the constituents necessitate specific quantitative ranges for each component. Thus it has been found necessary to adhere to the following schedule as set forth in Table 1 below;

Table I

| Constituent | Weight Percent Range Based Upon Total Composition |
| --- | --- |
| $SiO_2$ | 50–65 |
| $Al_2O_3$ | 2–6 |
| SrO | 15–30 |
| CaO | 3–10 |
| BaO | 3–10 |
| $K_2O$ | 0–2 |
| $Li_2O$ | 0–1 |
| $MoO_3$ | 0–½ |

The minima and maxima as expressed at Table I are determined by the following considerations;

$SiO_2$ — The use of less than 50 percent adversely affects chemical durability and more than 65 percent results in high viscosity and firing temperatures.

$Al_2O_3$ — The use of less than 2 percent adversely affects chemical durability and greater than 6 percent hampers flowability of the glaze.

CaO, BaO, SrO — These constituents asre fluxes for the $SiO_2$ which lower the melting point and viscosity of the glaze to a reasonable value. Use of these three constituents in less than the amounts indicated would have an insufficient effect upon melting point and viscosity, while greater amounts would hamper flowability by further reducing viscosity without a concomitant increase in wettability. CaO and BaO also improve chemical durability in the amounts indicated. All three of these constituents have a significant effect upon the coefficient of thermal expansion and their relative proportions may be adjusted within the stated ranges in order to achieve a matching value for the thermal expansion of the underlying substrate.

$K_2O$, $Li_2O$, $MoO_3$ — These constituents tend to improve flowability of the glaze at firing temperatures enabling yet thinner glaze thicknesses to be achieved. Amounts greater than 2 percent of $K_2O$ and 1 percent of $Li_2O$ tend to cause degradation of electrical properties and, K particular, electrical resistivity, while amounts of $MoO_3$ above one-half percent reduce its effectiveness in promoting wettability.

PREPARATION

The $SiO_2$, $Al_2O_3$ and $MoO_3$ are usually introduced into the glaze as oxides, while the other constituents are usually introduced as the carbonates. The raw materials are weighed and thoroughly mixed, for example, by placing them in a ball mill with sufficient quantity of suspending liquid such as ethylene glycol monoethyl ether acetate (cellosolve acetate) to prevent particle agglomeration. After milling for several hours the slurry is filtered and dried, for example, by heating in an oven at 110°C. The powder is melted in a suitable crucible at a temperature of about 1450° to 1550°C until a clear glass is obtained. The molten glass is poured into cold water to shatter it into small pieces which are then ground into a powder.

Care should be taken throughout processing, but particularly during grinding to powder that significant impurities are not introduced into the glaze composition. For example, extensive grinding in a conventional ball mill may result in sufficient incorporation of alumina from the grinding media and mill lining to detrimentally affect viscosity of the glaze. A vibratory mill is advantageously employed for the principal grinding of the glass instead of a conventional ball mill since the former is capable of grinding more rapidly to a fine particle size while incorporating almost no alumina into the glaze. The particle size of the resultant powder should be sufficiently small to insure that the subsequent glazing reaction takes place completely and uniformly. Practical considerations dictate a general preference for particles below 70 percent of the desired final glaze thickness. By way of example, it has been found that a milling time of about 24 hours in a vibratory mill is in general sufficient to reduce all particles to below 5 microns, which is suitable to form 0.3 mil (7.5 microns) thick coatings. Then the powder is stored until ready for application to a substrate surface.

To aid the practitioner, an exemplary grinding procedure is presented. The small pieces of glass are first placed in a ball mill with no liquid and allowed to mill for a time just sufficient to result in a particle size which is small enough to be accepted by the vibratory mill, usually small enough to pass through a 60-mesh screen. The material is then placed in the vibratory mill with water in the approximate proportion of 1 kg glass powder to 1.5 liter of water. The resultant slurry is ground for approximately 24 hours, filtered and oven dried, resulting in a glaze powder having an average particle size less than 2 microns with no particles above 5 microns and only a very slight increase (about 0.7 to 1.0 percent) in the alumina content. By comparison, milling in a conventional ball mill would require 3 to 4 days to achieve a comparable particle size and would result in a pick-up of about three times the original amount of alumina.

The present invention is primarily directed toward glazes utilized upon high density alumina substrates which, for purposes of the invention, are defined as compositions containing at least 85 percent by weight of aluminum oxide. The glazes may be applied by a variety of well-known techniques such as wet spraying, screen printing, as a preformed transfer tape, or by a photographic technique such as the one described by R. H. Minetti in U.S. Pat. No. 3,573.908.

Appropriate binders may be added to the glaze powder prior to application to the substrate to aid in holding the glaze in place. It is then permitted to dry in air and fired. Heating is continued until a temperature within the range of 1200° to 1350°C is attained, such temperature being dependent upon the maturation temperature of the composition of interest. Relatively thin glazes such as these are sensitive to firing temperatures. They must have sufficient heat to cause them to flow out to a smooth layer, but insufficient to cause the glaze-ceramic reaction layer to penetrate the surface of the glaze. A glaze thickness within the range of 0.3 to 1.0 mils corresponds approximately in weight to the range of 20 to 55 milligrams per square inch.

Examples of the application of the present invention are set forth below. They are intended merely as illustrative and it is to be appreciated that the processes described may be varied by one skilled in the art without departing from the spirit and scope of the invention.

A mixture of starting materials in the amounts indicated in Table II in weight percent, including four compositions of the invention corresponding to Examples 1 through 4, and 4 other compositions (including 3 prior art glazes) corresponding to examples 5 through 8, were weighed and thoroughly mixed, melted in a platinum crucible at about 1500°C to obtain a clear glass, and poured into cold water to obtain shattered pieces. The pieces were then reduced to an average particle size of 2 microns in accordance with the exemplary procedure described above, filtered, dried and screened through a 325 mesh screen to break up agglomerates. A spray composition was then prepared from 100 grams of glass powder and 32.5 grams of methyl methacrylate binder dissolved in 67.5 grams of cellosolve acetate. About 20 to 110 milligrams per square inch was deposited on a 99.5 percent $Al_2O_3$ substrate, corresponding to fired glaze thicknesses of from 0.3 to 2.0 mil. The compositions were then oven dried and fired at the times and temperatures indicated in Table III.

TABLE II

| | (Fired Composition) | | | | | | Prior Art Glazes | |
|---|---|---|---|---|---|---|---|---|
| | Ex. 1 | Ex. 2 | Ex. 3 | Ex. 4 | Ex. 5 | Ex. 6 | Ex. 7 | Ex. 8 |
| $SiO_2$ | 58.5 | 58.0 | 58.0 | 58.0 | 56.1 | 70.5 | 55.8 | 40 |
| $Al_2O_3$ | 3.5 | 3.5 | 3.5 | 3.5 | 10.2 | 20.0 | 18.7 | 8 |
| SrO | 25.5 | 25.0 | 24.5 | 24.5 | 23.7 | — | — | — |
| CaO | 7.0 | 6.5 | 6.5 | 6.5 | 5.5 | 5.5 | 5.9 | 5 |
| BaO | 5.5 | 5.0 | 5.0 | 5.0 | 4.5 | — | 16.1 | 5 |
| $K_2O$ | — | 1.0 | 1.0 | 2.0 | — | — | — | 2 |
| $Li_2O$ | — | 1.0 | 1.0 | — | — | — | 3.5 | — |
| $MoO_3$ | — | — | 0.5 | 0.5 | — | — | — | — |
| MgO | — | — | — | — | — | 3.9 | — | — |
| PbO | — | — | — | — | — | — | — | 18 |
| $Bi_2O_3$ | — | — | — | — | — | — | — | 10 |
| $B_2O_3$ | — | — | — | — | — | — | — | 10 |
| $TiO_2$ | — | — | — | — | — | — | — | 2 |
| $As_2O_3$ | — | — | — | — | — | — | — | 0.5 |

TABLE III

| Glaze | Temp.Time °C (min.) | Stable in Reducing Atmosphere | Fired Thickness (mils) | Acid Resistance | Thermal Expansion Coeff. $\times 10^6/°C$ | Insulation Resistance ohms (250°C) |
|---|---|---|---|---|---|---|
| Ex. 1 | 1300  5 | Yes | 0.5 | "AA" | 6.8 | $8 \times 10^{10}$ |
| Ex. 2 | 1250  5 | Yes | 0.3 | "AA" | 7.2 | $2 \times 10^{10}$ |

TABLE III-continued

| Glaze | Temp. °C | Time (min.) | Stable in Reducing Atmosphere | Fired Thickness (mils) | Acid Resistance | Thermal Expansion Coeff. $\times 10^6/°C$ | Insulation Resistance ohms (250°C) |
|---|---|---|---|---|---|---|---|
| Ex. 3 | 1250 | 5 | Yes | 0.3 | "AA" | 7.2 | $2 \times 10^{10}$ |
| Ex. 4 | 1250 | 5 | Yes | 0.3 | "AA" | 7.3 | $8 \times 10^{10}$ |
| Ex. 5 (Prior Art) | 1300 | 5 | Yes | 1.0 | "AA" | 6.8 | $8 \times 10^{10}$ |
| Ex. 6 | — | — | Yes | 2.0 | "AA" | — | — |
| Ex. 7 | — | — | Yes | 2.0 | "AA" | — | — |
| Ex. 8 | 1000 | 10 | No | 0.3 | "AA" | 5.4 | $4 \times 10^{10}$ |

Fired thickness, stability in reducing atmosphere, acid resistance, thermal expansion coefficient and insulation resistance were next determined by conventional techniques. More specifically, fired thickness was determined as the minimum thickness which gave a smooth defect-free surface under low power (60X) magnification. Stability in reducing atmosphere was determined by heating the fired glazes to 500°C in an $H_2$ atmosphere, and observing any changes. Acid resistance was determined by the Porcelain Enamel Institute Acid Resistance Test (Bulletin T-21). Thermal expansion coefficient was determined over the range 25° to 500°C. Insulation resistance was determined by measuring the resistance across a 0.010 inch by 30 inches path.

It will be noted that prior art glazes of Examples 6 and 7 could not be obtained in fired thicknesses below 1 mil, while the prior art glaze of Example 8 turned dark, indicating that it is not stable in a reducing atmosphere. The glaze of Example 5 could not be obtained in fired thickness below 1 mil either, due to an excess of $Al_2O_3$ over the amounts required by the invention.

Of the inventive compositions, corresponding to Examples 1 through 4, those which contained additives from the group $K_2O$, $Li_2O$ and $MoO_3$ were obtained in fired thicknesses below 0.5 mil, specifically 0.3 mil.

What is claimed is:

1. Article comprising a high density alumina substrate and a fired glaze covering at least a portion of a surface of said substrate characterized in that said glaze has a thickness not exceeding 1 mil and further characterized in that said glaze consists essentially of the following components in the amounts indicated:

| | Percent by Wt. |
|---|---|
| $SiO_2$ | 50–65 |
| $Al_2O_3$ | 2–6 |
| SrO | 15–30 |
| CaO | 3–10 |
| BaO | 3–10. |

2. Article of claim 1 in which said glaze contains at least two members selected from the group consisting of $K_2O$, $Li_2O$ and $MoO_3$ in the amounts indicated:

| | Percent by Wt. |
|---|---|
| $K_2O$ | 0–2.0 |
| $Li_2O$ | 0–1.0 |
| $MoO_3$ | 0–0.5. |

3. Article of claim 2 in which said glaze contains $K_2O$ and $Li_2O$.

4. Article of claim 2 in which said glaze contains $K_2O$ and $MoO_3$.

5. Article of claim 2 in which said glaze contains $K_2O$, $Li_2O$ and $MoO_3$.

* * * * *